United States Patent
Seong et al.

(10) Patent No.: US 11,846,584 B2
(45) Date of Patent: Dec. 19, 2023

(54) APPARATUS FOR DETECTING SLURRY SPREAD VOLUME USING TERAHERTZ WAVE, SPREAD SYSTEM AND DETECTING METHOD USING THE SAME

(71) Applicants: HYUNDAI MOTOR COMPANY, Seoul (KR); KIA MOTORS CORPORATION, Seoul (KR); ELECTRONICS AND TELECOMMUNICATIONS RESEARCH INSTITUTE, Daejeon (KR)

(72) Inventors: Ha Seung Seong, Daejeon (KR); Ho Jin Lee, Daejeon (KR); Il Min Lee, Daejeon (KR); Ki Won Moon, Daejeon (KR); Eui Su Lee, Sejong-si (KR); Dong Woo Park, Sejong-si (KR); Jeong Woo Park, Daejeon (KR); Kyung Hyun Park, Daejeon (KR); Hyun Soo Kim, Daejeon (KR)

(73) Assignees: HYUNDAI MOTOR COMPANY, Seoul (KR); KIA MOTORS CORPORATION, Seoul (KR); ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 376 days.

(21) Appl. No.: 17/099,907

(22) Filed: Nov. 17, 2020

(65) Prior Publication Data
US 2021/0172872 A1 Jun. 10, 2021

(30) Foreign Application Priority Data
Dec. 10, 2019 (KR) .................. 10-2019-0164172

(51) Int. Cl.
*G01N 21/3581* (2014.01)
*G01B 11/06* (2006.01)
(Continued)

(52) U.S. Cl.
CPC ..... *G01N 21/3581* (2013.01); *G01B 11/0616* (2013.01); *G01B 21/042* (2013.01);
(Continued)

(58) Field of Classification Search
CPC ....... G01N 21/3581; G01N 2021/8427; G01N 2021/8663; G01N 21/8422;
(Continued)

(56) References Cited

U.S. PATENT DOCUMENTS

| 2005/0181268 A1* | 8/2005 | Ohya ............ H01M 4/921 429/492 |
| 2012/0307041 A1* | 12/2012 | Fujiwara ........... G01N 21/8422 348/E5.049 |

(Continued)

FOREIGN PATENT DOCUMENTS

| JP | 2013175328 | * | 9/2013 | ............ C01B 31/02 |
| JP | 2017-62201 A | | 3/2017 | |

*Primary Examiner* — Michael P LaPage
(74) *Attorney, Agent, or Firm* — MORGAN, LEWIS & BOCKIUS LLP

(57) ABSTRACT

A measurement apparatus for measuring a coating amount of a slurry according to the present disclosure includes a light emitter configured to irradiate terahertz wave onto a release paper coated with the slurry, a light receiver configured to receive the terahertz wave, which is irradiated from the light emitter and passes through the release paper coated with the slurry, to obtain a power of the terahertz wave, and a calculating part configured to calculate a thickness of an electrode, formed from the slurry applied to the release paper, based on the power of the terahertz wave received by the light receiver.

15 Claims, 12 Drawing Sheets

(51) Int. Cl.
  *G01N 23/223* (2006.01)
  *G01B 21/04* (2006.01)
  *G01N 21/84* (2006.01)

(52) U.S. Cl.
  CPC ....... *G01N 21/8422* (2013.01); *G01N 23/223* (2013.01); *G01B 11/0691* (2013.01); *G01N 2021/8427* (2013.01)

(58) Field of Classification Search
  CPC ............ G01N 23/2206; G01N 23/223; G01N 2021/8433; G01N 2223/071; G01N 2223/073; G01N 2223/076; G01N 2223/1016; G01N 2223/61; G01B 11/0616; G01B 11/0633; G01B 11/0691; G01B 21/042; G01B 11/0625
  See application file for complete search history.

(56) References Cited

U.S. PATENT DOCUMENTS

| | | | | |
|---|---|---|---|---|
| 2014/0028999 | A1* | 1/2014 | Jun | G01B 7/107 356/72 |
| 2015/0268030 | A1* | 9/2015 | White | G01N 21/8422 250/353 |
| 2015/0316475 | A1* | 11/2015 | Rahman | G01N 21/9505 250/339.02 |
| 2017/0023469 | A1* | 1/2017 | Zimdars | G01N 21/41 |
| 2018/0274904 | A1* | 9/2018 | Miura | G01B 15/02 |
| 2021/0025687 | A1* | 1/2021 | Ichikawa | G01B 11/0691 |
| 2022/0120667 | A1* | 4/2022 | Mästle | G01N 21/01 |
| 2022/0328865 | A1* | 10/2022 | Visco | G01N 21/8914 |

\* cited by examiner

APPARATUS FOR DETECTING SLURRY SPREAD VOLUME USING TERAHERTZ WAVE, SPREAD SYSTEM AND DETECTING METHOD USING THE SAME

CROSS-REFERENCE TO RELATED APPLICATION

This application claims the benefit of priority to Korean Patent Application No. 10-2019-0164172, filed in the Korean Intellectual Property Office on Dec. 10, 2019, the entire contents of which are incorporated herein by reference.

TECHNICAL FIELD

The present disclosure relates to an apparatus for detecting a slurry coating amount, a coating system, and a measurement method.

BACKGROUND

To manufacture an electrode of a fuel cell, a method of forming the electrode on a release paper using a slurry composed of a liquid electrode solution is used. When the electrode is formed in the above-described way, a process, which includes applying the slurry to the release paper and forming the liquid slurry into a solid electrode through a drying process, is performed.

It is necessary for a thickness of the electrode to be kept constant. When the thickness of the electrode is too thin or too thick, the electrode may not properly perform a role of an originally intended electrode and it may not be easy to combine with other components of a product whose dimensions are already determined. Therefore, there is a need for a technique capable of confirming whether the thickness of the electrode is suitable for use in the product.

SUMMARY

The present disclosure has been made to solve the above-mentioned problems occurring in the prior art while advantages achieved by the prior art are maintained intact.

An aspect of the present disclosure provides an apparatus for measuring a slurry coating amount capable of measuring a thickness of an electrode in a production process, a coating system, and a measurement method.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a measurement apparatus includes a light emitter to irradiate terahertz wave onto a release paper coated with the slurry, a light receiver configured to receive the terahertz wave, which is irradiated from the light emitter and passes through the release paper coated with the slurry, to obtain a power of the terahertz wave, and a calculating part configured to calculate a thickness of an electrode, formed from the slurry applied to the release paper, based on the power of the terahertz wave received by the light receiver.

According to an aspect of the present disclosure, a coating system of a slurry includes a coater configured to apply a slurry to a release paper, a light emitter configured to irradiate terahertz wave to the release paper coated with the slurry, a light receiver configured to receive a power of the terahertz wave passing through the release paper coated with the slurry, a drying furnace configured to heat and dry the slurry applied to the release paper to form an electrode, a content acquisitor configured to acquire a platinum content of the electrode, and a calculating part configured to calculate a thickness of the electrode based on the power of the terahertz wave received by the light receiver.

According to an aspect of the present disclosure, a method of measuring an amount of slurry includes irradiating terahertz wave to a release paper coated with a slurry, obtaining a power of the terahertz wave passing through the release paper coated with the slurry, and calculating a thickness of an electrode formed from the slurry applied to the release paper based on the obtained power of the terahertz wave.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
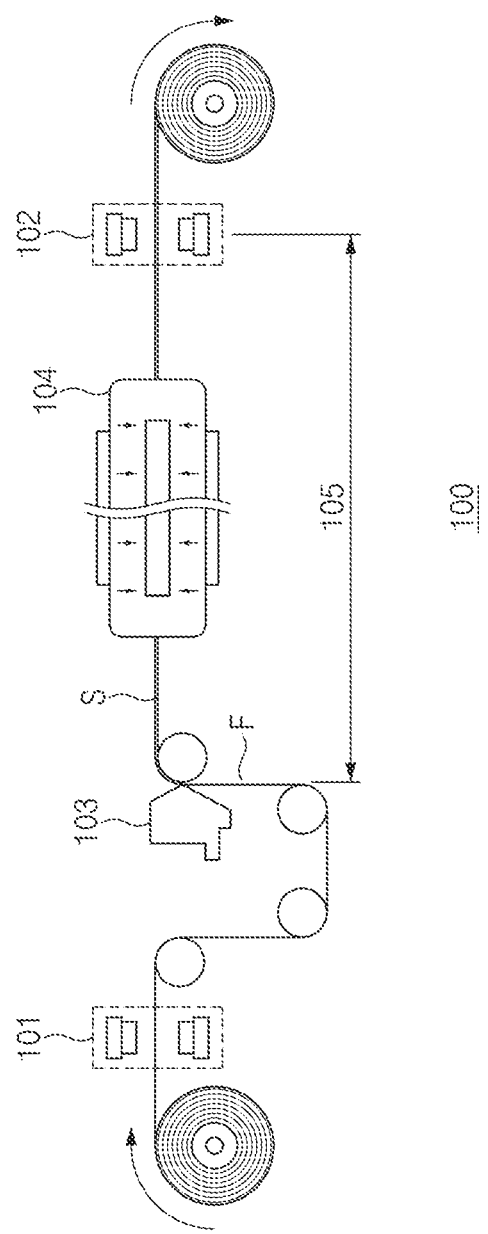
FIG. 1 is a conceptual diagram of exemplary measuring devices and a coating system using the same.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a conceptual diagram of exemplary measuring devices 101 and 102 and a coating system 100 using the same.

The exemplary measuring devices 101 and 102 as illustrated in FIG. 1 and the coating system 100 using the same may be considered. Referring to the drawing, in the coating system 100 in which a slurry "S" is applied to one surface of a release paper "F" using a coater 103 and dried by a drying furnace 104, measurement is performed by the measuring devices 101 and 102 before and after coating and drying of the slurry "S". Before the slurry "S" is applied to the release paper "F," the measurement of the release paper "F" is performed by the base measuring device 101. After drying is completed, an electrode is measured by the electrode measuring device 102. The base measuring device 101 may measure characteristics of the release paper "F" to which the slurry "S" is not applied in a manner of measuring the release paper "F" by ultrasonic wave. The electrode measuring device 102 may irradiate the ultrasonic wave on the release paper "F," on which the slurry "S" is applied and dried to form the electrode, to measure characteristics of the release paper "F" and the slurry "S."

Meanwhile, when the above-described measuring devices 101 and 102 are used, a thickness of the electrode formed immediately after the slurry "S" is applied to the release paper "F" may not be measured and may be measured only after passing through the drying furnace 104. In addition, the characteristics of the release paper "F" may be changed before and after passing through the drying furnace 104, and thus there may be a problem in reliability of measurement data of the measuring device 102. Furthermore, when a defect is found nearby the electrode measuring device 102, there is a problem that the release paper "F" having a length 105 from the coater 103, to which the slurry "S" is applied, to the electrode measuring device 102 is discarded. When the ultrasonic wave is used for the electrode measuring device, the ultrasonic wave for measuring the liquid slurry "S" is not capable of passing through the slurry "S" applied to the release paper "F," and thus it is impossible to measure an amount of the applied slurry "S".

Figure 2:
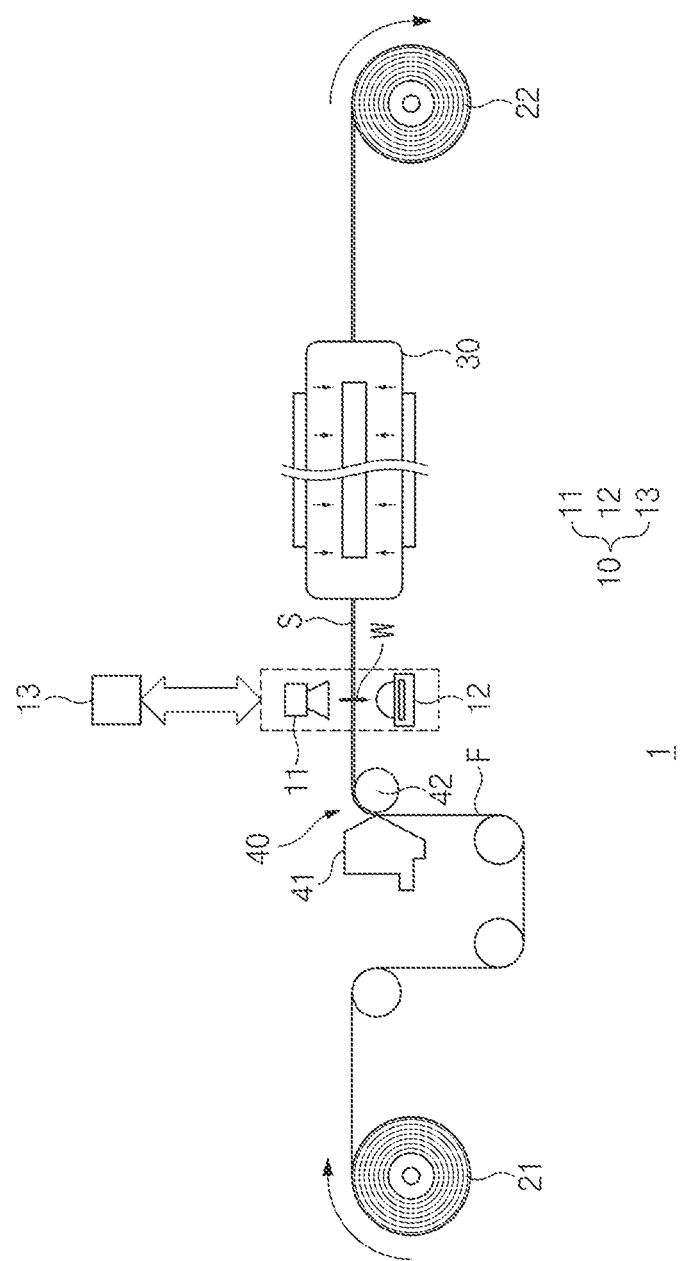
FIG. 2 is a conceptual diagram of a measuring device and a coating system using the same, according to an embodiment of the present disclosure.
Figure 3:
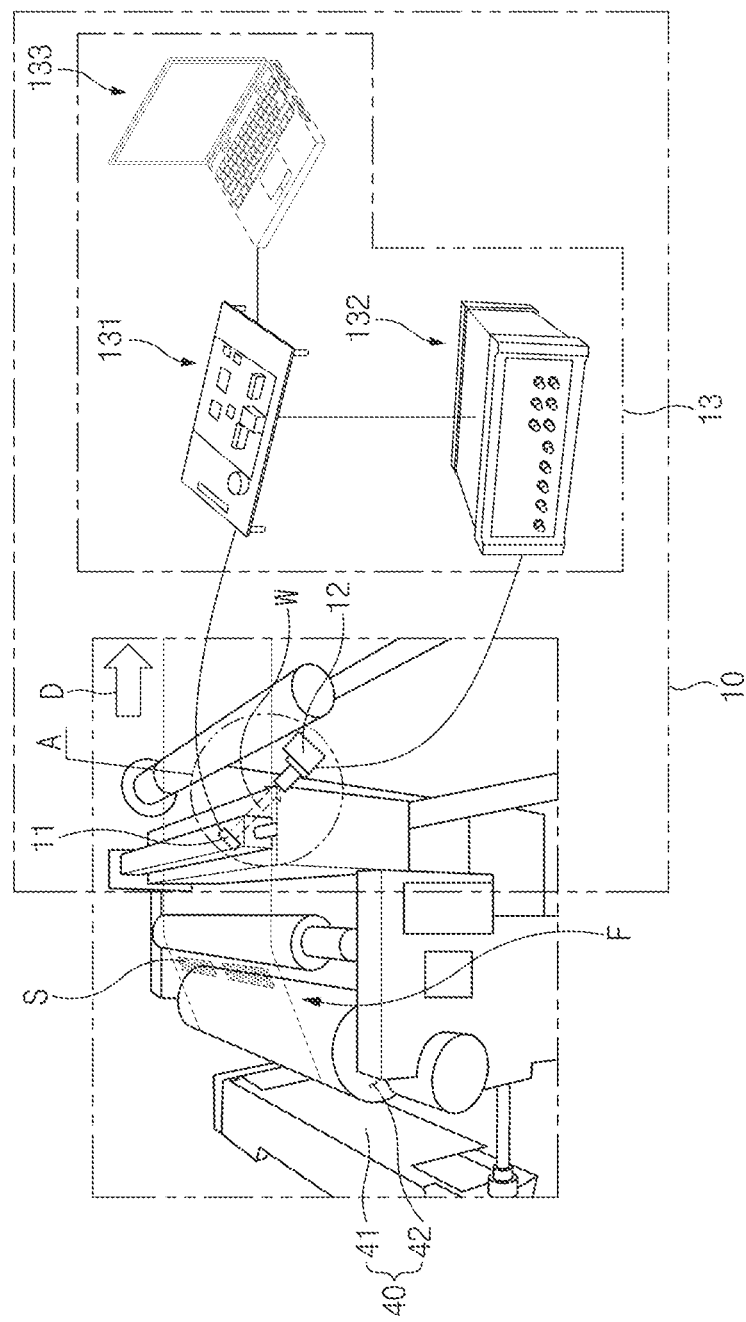
FIG. 3 is a conceptual diagram illustrating a configuration of the calculating part of a coating system according to an embodiment of the present disclosure, along with other specific configurations of the coating system.
Figure 4:
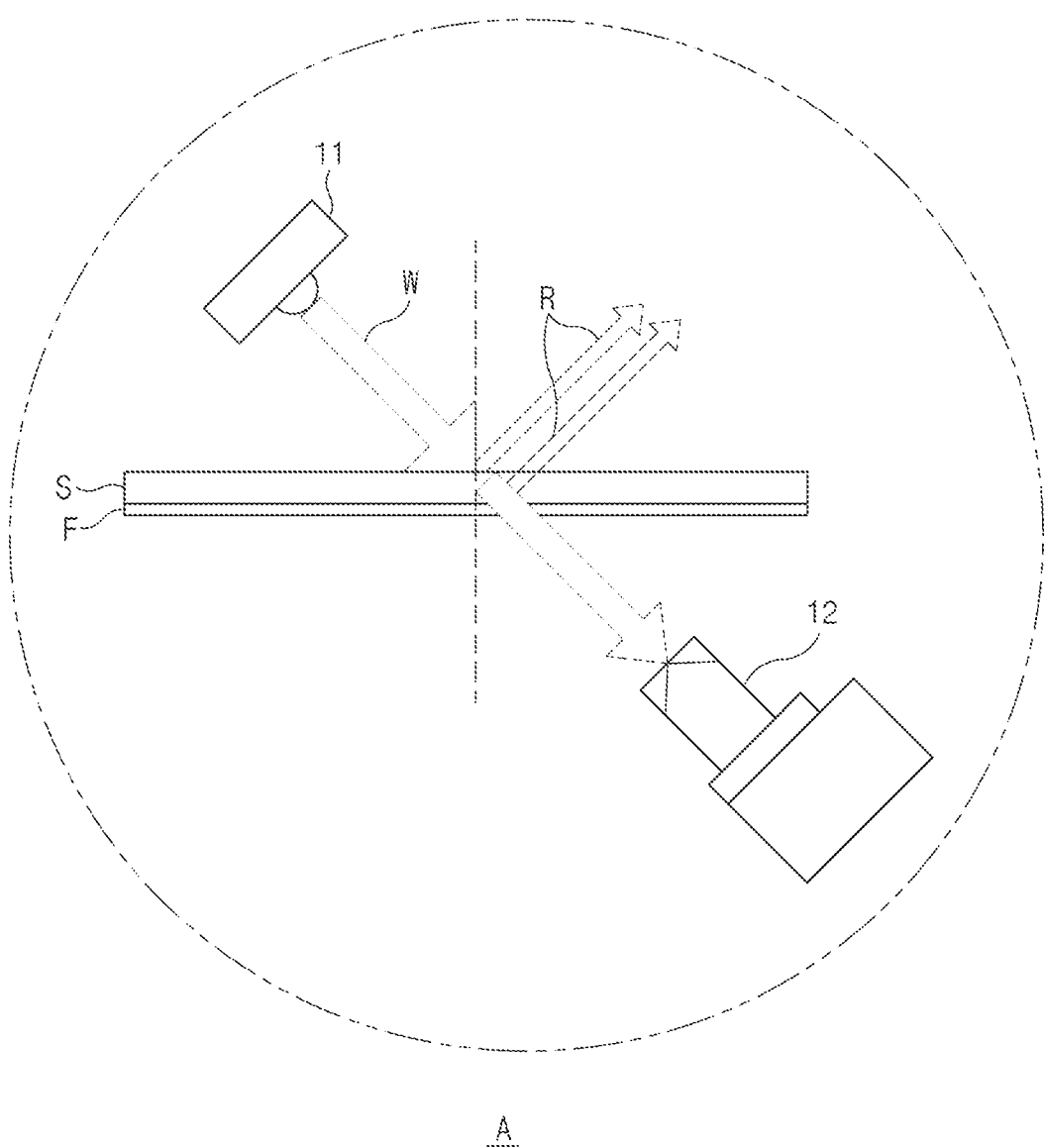
FIG. 4 is a conceptual diagram specifically illustrating a situation in which a light emitter emits terahertz wave and a light receiver receives the terahertz wave in a measuring device according to an embodiment of the present disclosure.

FIG. 2 is a conceptual diagram of a measuring device 10 and a coating system 1 using the same, according to an embodiment of the present disclosure. FIG. 3 is a conceptual diagram illustrating a configuration of a calculating part 13 of the coating system 1 according to an embodiment of the present disclosure, along with other specific configurations of the coating system 1. FIG. 4 is a conceptual diagram specifically illustrating a situation in which a light emitter 11 emits terahertz wave "W" and a light receiver 12 receives the terahertz wave "W" in the measuring device 10 according to an embodiment of the present disclosure. FIG. 4 is an enlarged view of a portion indicated by 'A' in FIG. 3.

Referring to the drawings, the measuring device 10 according to an embodiment of the present disclosure may include the light emitter 11, the light receiver 12 and the calculating part 13. In addition, the coating system 1 including the above-described the measuring device 10 may include a coater 40 and a drying furnace 30, and may further include an unwinder 21 and a winder 22.

Unwinder 21 and Winder 22

The unwinder 21 is a component for unwinding the rolled release paper "F," and the winder 22 is a component for winding the release paper "F" which is released by the unwinder 21 and then the slurry "S" composed of an electrode solution containing platinum is applied. Each of the unwinder 21 and the winder 22 may include a cylindrical roller which winds the release paper "F" along an outer circumferential surface thereof. As the roller rotates, the unwinder 21 may release the release paper "F" from the outer circumferential surface thereof and provide the release paper "F" to the coater 40 and the measuring device 10, and the winder 22 may include a reel that is good for carrying the unwound release paper "F" on which the slurry "S" is applied and dried to form the electrode. However, a method in which the unwinder 21 and the winder 22 unwinds and winds the release paper "F" is not limited thereto.

The unwinder 21 and the winder 22 are arranged to be spaced apart from each other. Therefore, between the unwinder 21 and the winder 22, the coater 40 and the measuring device 10 may be disposed. In addition, a plurality of rollers may be disposed between the unwinder 21 and the winder 22. To allow the release paper "F" released from the unwinder 21 to be transferred to the winder 22 while maintaining a specific tension, the rollers are in contact with and rotate the release paper "F" to transfer the release paper "F" in a specific direction by friction.

Coater 40

The coater 40 is a component for applying the slurry "S" to the release paper "F." The coater 40 may have a spout positioned adjacent to one side of the release paper "F," the slurry "S" may be sent to the release paper "F" through the spout, and the coater 40 may include a slurry provider 41 in which the slurry "S" is applied on one side of the release paper "F".

In order for the slurry "S" to be supplied to the release paper "F" well, the coater 40 may further include a coating roller 42 for placing the release paper "F" very close to the slurry provider 41. The coating roller 42 may be disposed in contact with the other side of the release paper "F" opposite to one side of the release paper "F" in which the slurry provider 41 is adjacent. Because the coating roller 42 supports the release paper "F" from the other side of the release paper "F," the slurry provider 41 may easily apply the slurry "S" on one side of the release paper "F."

The coater 40 may not form the electrode by continuously discharging the slurry "S", but may apply the slurry "S" on the release paper "F" depending on a specific pattern to form the electrode.

Measuring Device 10

The measuring device 10 is a component for acquiring desired information from the release paper "F" coated with the slurry "S" using a terahertz wave "W." The measuring device 10 includes the light emitter 11, the light receiver 12, and the calculating part 13. The measuring device 10 may be positioned before the drying furnace 30 and after the coater 40 based on a direction "D" in which the release paper "F" is transferred.

The light emitter 11 is a component that irradiates terahertz wave "W" to the release paper "F" to which the slurry "S" is applied. Therefore, the light emitter 11 may include a light emitting member capable of emitting electromagnetic wave and may be a light emitting member including a light emitting device emitting continuous wave laser. The terahertz wave "W" emitted by the light emitting member may be the terahertz wave "W" having a frequency of 0.1 THz or more and 10 THz or less.

The light emitter 11 may be arranged adjacent to one side of the release paper "F" to which the slurry "S" is applied, may be spaced apart from the release paper "F", and may be arranged to face the release paper "F." Therefore, when the light emitter 11 irradiates the terahertz wave "W" on the release paper "F" coated with the slurry "S", some of the irradiated terahertz wave "W" may be incident on the slurry "S" and discharged after passing through the release paper "F", others may be absorbed, and the others "R" may be reflected. The terahertz wave "W" discharged through the release paper "F" is transmitted to the light receiver 12 and the light receiver receives the terahertz wave "W". The terahertz wave "W" irradiated by the light emitter 11 may be also irradiated on a portion of the release paper "F" to which the slurry "S" is not applied and may pass through the release paper "F" to be transferred to the light receiver 12.

The light receiver 12 is a component that receives the terahertz wave "W," which is irradiated from the light emitter 11 and passes through the release paper "F" coated with the slurry "S," and acquires power. Therefore, the light receiver 12 may be arranged opposite to the side where the light emitter 11 is arranged based on the release paper "F," to allow the light receiver 12 to receive the terahertz wave "W" passing though the release paper "F" coated with the slurry "S."

The light receiver 12 and the light emitter 11 may be aligned in a straight line to allow the light receiver 12 to receive the terahertz wave "W" well. The straight line on which the light receiver 12 and the light emitter 11 are arranged may form a specific angle with the release paper "F" transferred between the light receiver 12 and the light emitter 11 and the angle may be less than a total reflection critical angle.

The light receiver 12 acquires the power of the terahertz wave "W" from the received terahertz wave "W" which may have unit of watt. The calculating part 13 is electrically connected to the light emitter 11 and the light receiver 12 to receive the power of the obtained terahertz wave "W," and calculates a thickness of the electrode formed from the slurry "S" applied to the release paper "F" based on the power of the obtained terahertz wave "W."

The calculating part 13 may include a terahertz wave generator 131, a data acquisitor 132, and a data monitor 133 which are electrically connected to one another. The terahertz wave generator 131 may be optically connected to the light emitter 11 and may determine a waveform of the terahertz wave "W" to be irradiated from the light emitter 11 to transmit a light to be irradiated to the light emitter 11 through an optical fiber. The data acquisitor 132 may include a data acquisition (DAQ) interface and may be electrically connected to the light receiver 12 to amplify a signal responding to the power of the terahertz wave "W" acquired by the light receiver 12 and to transmit the amplified signal to the data monitor 133. A user may check a current status of the terahertz wave generator 131 and the data acquisitor 132 through the data monitor 133. The data monitor 133 may calculate information including a platinum content of the slurry "S" and a thickness of the electrode to be formed from the slurry "S", using the obtained terahertz wave "W" power and display the calculated information using a display device (not illustrated) along with information on the terahertz wave "W" emitted and the power of the obtained terahertz wave "W."

The terahertz wave generator 131 may be electrically connected to the data acquisitor 132, and thus may further transmit a reference waveform to allow the data acquisitor 132 to extract a desired signal among signals received from the light receiver 12.

The data monitor 133 may include at least one processor composed of elements capable of logical operations, such as a central processing unit (CPU). In addition, the data monitor 133 may be connected to at least one processor and may include a storage medium capable of storing a plurality of control instructions and the power of the terahertz wave "W" obtained from the light receiver 12. The at least one processor may be connected to the terahertz wave generator 131 and the data acquisitor 132 for control. The control instructions, when executed, cause the processor to perform calculations or controls described below.

The measuring device 10 according to an embodiment of the present disclosure, when the thickness of the electrode calculated by the calculating part 13 is outside a predetermined normal thickness range, may further include a notifier (not illustrated) for transmitting a notification to the user. The notifier may include a display device or a speaker to transmit the notification to the user that a defect occurs in a current electrode production process in a visual or audible manner. Alternatively, the notifier may include a communication module to transmit an electrical signal responding to the notification to a device possessed by the user.

The data monitor 133 of the calculating part 13 may calculate the platinum content of the slurry "S" based on the power of the terahertz wave "W" obtained and may calculate the thickness of the electrode based on the calculated platinum content of the slurry "S." The storage medium may store a table or a relational expression between two variables corresponding to the platinum content of the slurry "S" and the thickness of the electrode generated based on the platinum content and the data monitor 133 puts the calculated platinum content of the slurry "S" into the table or relational expression to obtain the corresponding thickness of the electrode. In general, the platinum content in the slurry "S" and the thickness of the electrode formed by the slurry "S" have a proportional relationship.

The thickness of the electrode may be calculated from the platinum content calculated by the data monitor 133, and when the calculated thickness of the electrode is outside a specific normal thickness range, the calculating part 13 may notify the defect occurrence to the user through the above-mentioned notifier, and the user may take appropriate actions such as reducing or increasing the amount of applying the slurry "S" by controlling the coater 40.

When it is determined whether the measured thickness of the electrode is within the normal thickness range after the slurry "S" is applied and dried, the release paper corresponding to a distance from a position where the slurry "S" is applied to a position where the thickness of the electrode is measured and the slurry "S" applied thereto are wasted although the coating system 1 is entirely stopped at the time point when the defect is confirmed. However, as described in an embodiment of the present disclosure, the platinum content of the slurry "S" is obtained by the measuring device 10 immediately after the slurry "S" is applied in the coater 40, and when the thickness of the electrode to be obtained therefrom is calculated to confirm whether the thickness of the electrode is within the normal thickness range, a small amount of the release paper "F" and the slurry "S" applied thereon are removed and the process is performed again to the reduce waste of the release paper "F" and the slurry "S." Because the thickness of the electrode to be generated is obtained using the terahertz wave "W" having a high transmittance, it is possible to measure the liquid slurry "S," and thus the measuring device 10 and the coating system 1, each which has above-described structure, may be configured.

The calculating part 13 may use a frequency domain spectrum (FDS) method rather than a time point domain spectrum (TDS).

Hereinafter, a description will be given of a calibration process of the measuring device 10 according to an embodiment of the present disclosure with reference to the drawings.

Figure 5:
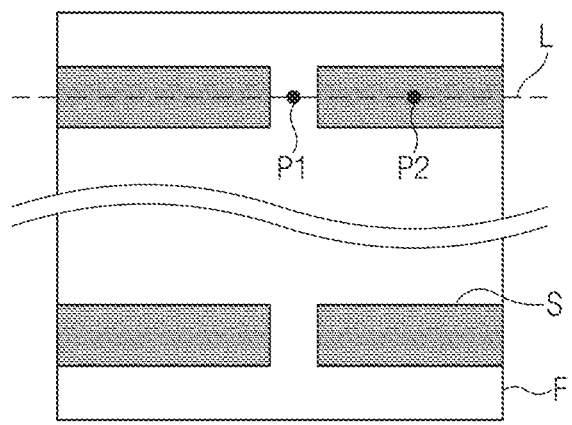
FIG. 5 is a conceptual diagram illustrating positions to be measured on a release paper using a measuring device according to an embodiment of the present disclosure.
Figure 6:
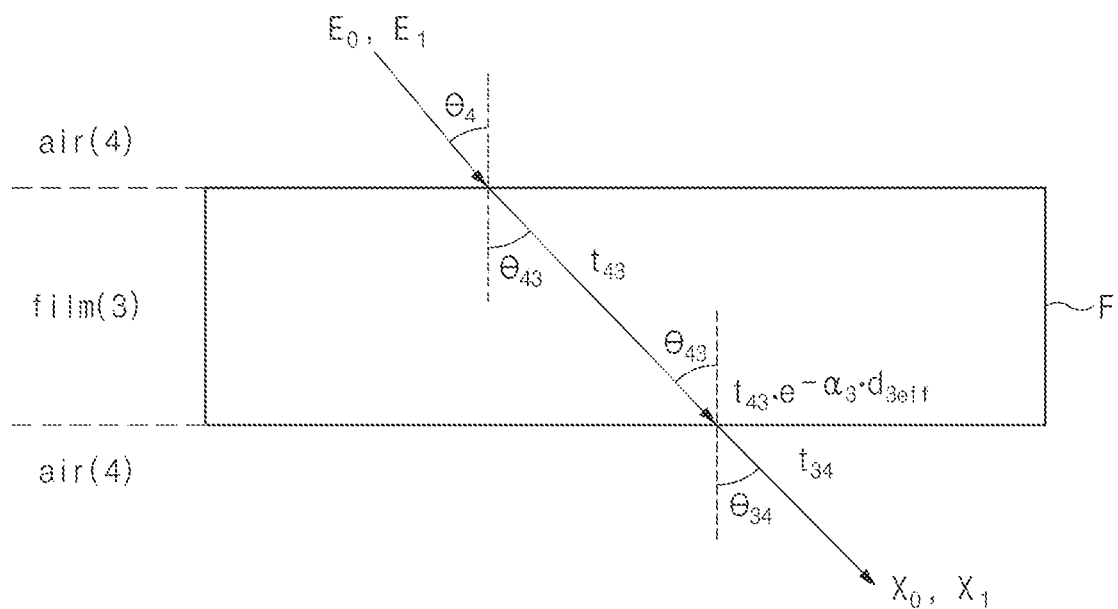
FIG. 6 is a view illustrating a traveling direction of terahertz wave irradiated on a release paper to which a slurry is not applied, by a measuring device according to an embodiment of the present disclosure.
Figure 7:
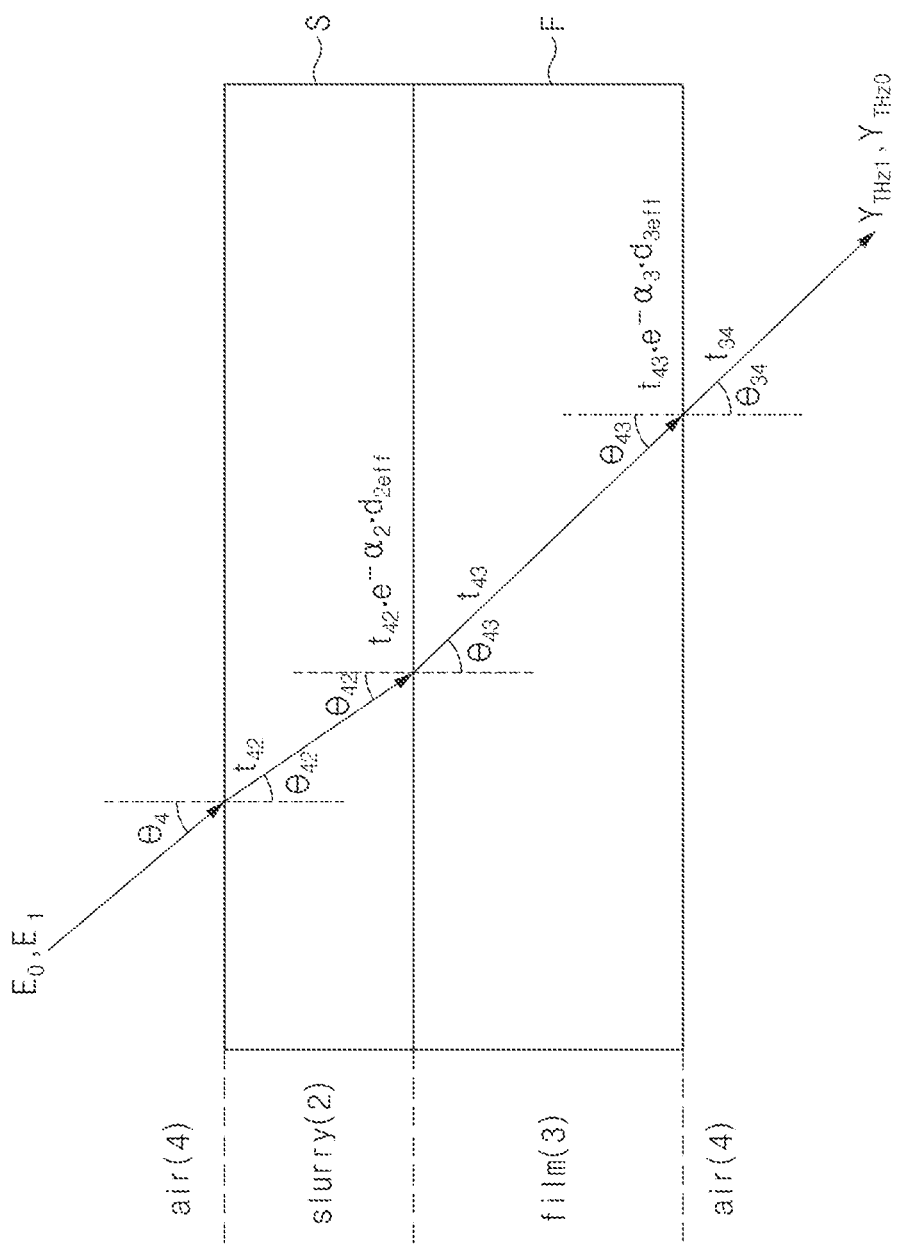
FIG. 7 is a view illustrating a traveling direction of terahertz wave irradiated on a release paper coated with a slurry by a measuring device according to an embodiment of the present disclosure.
Figure 8:
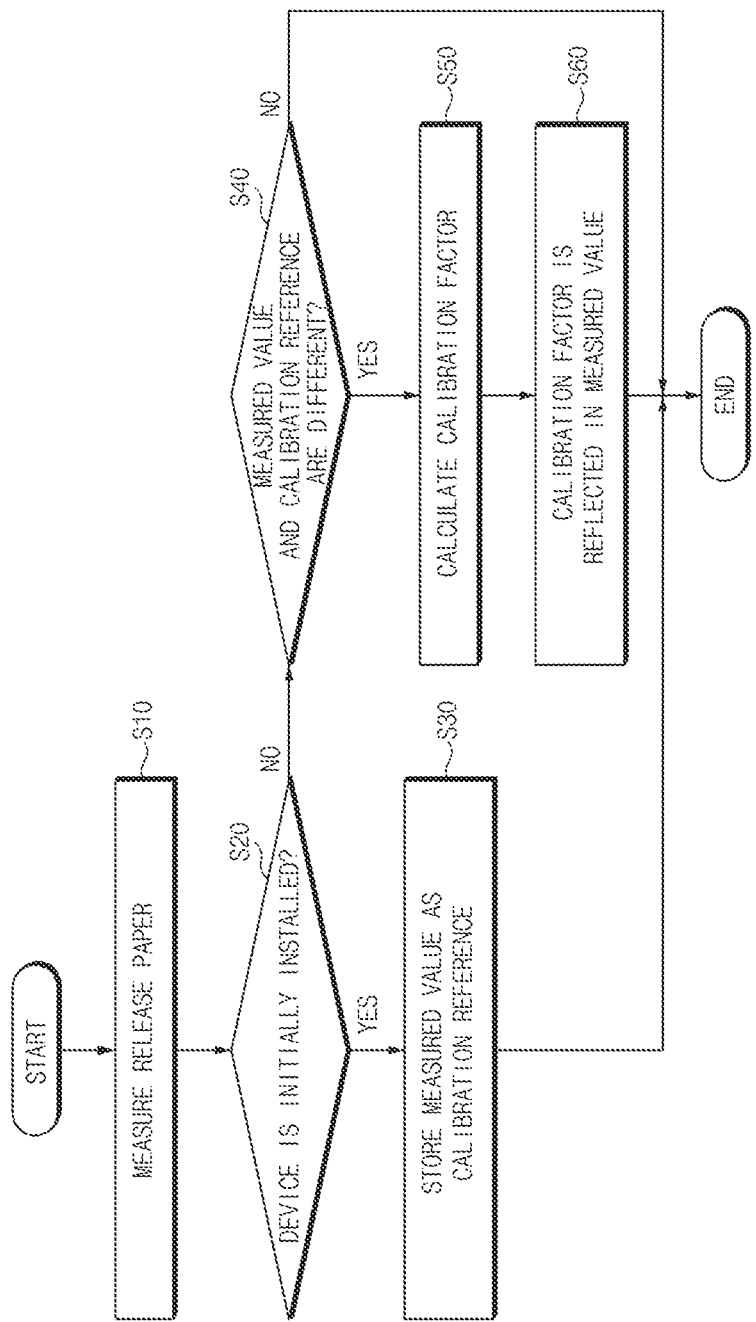
FIG. 8 is a flowchart illustrating a method including generating a calibration reference and correcting a current release paper power based on the calibration reference, according to an embodiment of the present disclosure.

FIG. 5 is a conceptual diagram illustrating positions to be measured on the release paper "F" using the measuring device 10 according to an embodiment of the present disclosure. FIG. 6 is a view illustrating a traveling direction of the terahertz wave "W" irradiated on the release paper "F" to which the slurry "S" is not applied, by the measuring device 10 according to an embodiment of the present disclosure. FIG. 7 is a view illustrating a traveling direction of the terahertz wave "W" irradiated on the release paper "F" coated with the slurry "S" by the measuring device 10 according to an embodiment of the present disclosure. FIG. 8 is a flowchart illustrating a method including generating a calibration reference and correcting a current power of the release paper "F" based on the calibration reference, according to an embodiment of the present disclosure.

During the use of the measuring device 10, as characteristics of the light emitter 11 or the light receiver 12 change, measurement data may be obtained differently in the same environment. A certain correction is necessary in the calculation process of the calculating part 13 to obtain the same data while continuing to use the light emitter 11 or the light receiver 12 in which these characteristics are changed. The above-described certain correction is called calibration. The calibration may be performed by the calculating part 13, and the control instructions stored in the above-described storage medium may be performed to allow the processor to control the following, when executed.

In the measuring device 10, the light emitter 11 irradiates the terahertz wave "W" on the release paper "F" coated with the slurry "S" and the light receiver 12 receives the terahertz wave "W" passing through the release paper "F" to obtain the power of the terahertz wave "W" in S10. The calculating part 13 determines whether a time point at which the terahertz wave "W" is irradiated and received is a time point when the measuring device 10 is first installed in S20. When the corresponding time point is the first installation time point of the measuring device 10, the obtained terahertz wave "W" becomes a reference power, which is a power obtained by passing through the position where the slurry "S" is not applied in the release paper "F". That is, the reference power may be stored in the storage medium of the calculating part 13 in S30. The above-described reference power serves as a calibration reference.

Referring to FIG. 5, an irradiation line "L" in which the terahertz wave "W" is capable of being irradiated by the light emitter 11 on the release paper "F" coated with the slurry "S" is illustrated as a broken line. The terahertz wave "W" passes through point P1 where slurry "S" is not applied to the release paper "F," and passes through the other point where the slurry "S" is applied to the release paper "F." The power of the terahertz wave for each point may be obtained for calibration. That is, when the measuring device 10 is initially installed, the power of the terahertz wave obtained through point P1 becomes the reference power.

When the measurement is conducted at a specific time point that is not the first time that the measurement is conducted after the measuring device 10 is installed, the power of the terahertz wave "W" measured at the current release paper "F" at the specific time point is compared to the reference power in S40. The current power obtained at a certain point may include a power measuring an area to which the current slurry "S" is applied, which is a power at a specific time point from the terahertz wave "W" passing through the area to which the slurry "S" is applied among the release paper "F" coated with the slurry "S," and a power measuring a current release paper "F" area, which is a power obtained at a specific time point from the terahertz wave "W" passing through the area to which the slurry is not applied, and may be stored at the storage medium.

When the power of the terahertz wave measured at the current release paper "F" area is equal to the reference power, calibration does not need to be performed because there is no change in characteristics of the light emitter 11 and the light receiver 12. However, when the power of the terahertz wave measured at the current release paper "F" area is not equal to the reference power, calibration should be performed because a change in characteristics of the light emitter 11 and the light receiver 12 occurs.

Using the power of the terahertz wave measured at the current release paper "F" area and the reference power, the power of the terahertz wave measured at an area to which the slurry "S" is applied may be corrected through calibration. The calculated correction power may be used as a basis for calculating a thickness of the electrode formed at a specific time point. When the reference power is not equal to the power of the terahertz wave measured at the current release paper "F" area, a calibration factor is calculated from the current release paper "F" power and the reference power in S50, the calculated calibration factor is reflected to the power of the terahertz wave measured at the area to which the current slurry "S" is applied to obtain the correction power in S60. The calculating part 13 determines the platinum content of the slurry "S" to use the correction power as a basis for calculating the thickness of the electrode obtained at the specific time point.

A method of obtaining the correction factor will be described with reference to FIGS. 6 and 7. Referring to FIG. 6, a reference power $X_0$, that is the power of the terahertz wave "W", which passes through the area of the release paper "F" to which the slurry "S" is not applied, obtained from the light receiver 12 may be expressed as Equation 1 below and the power $X_1$ measuring the current release paper "F" area may be expressed as Equation 2 below. The measured powers, expressed in the following equations, are expressed to have units of voltage. This is because the voltage generated from the received terahertz wave is measured when the terahertz wave "W" is measured in the light receiver 12.

$$X_0 = E_0 t_{43}^2 e^{-\alpha_3 d_3 eff} t_{34}^2 R_0 \quad \text{[Equation 1]}$$

$$X_1 = E_1 t_{43}^2 e^{-\alpha_3 d_3 eff} t_{34}^2 R_1 \quad \text{[Equation 2]}$$

Here, $E_0$ and $E_1$ are the power of the terahertz wave "W" irradiated from the light emitter 11 at the time point of initial installation and the power of the terahertz wave "W" irradiated from the light emitter 11 at a specific time point, respectively. When the terahertz wave "W" is incident from an "i" medium to a "j" medium, "$t_{ij}$" denotes a transmittance of the terahertz wave "W" at a boundary between the media, "$\alpha_i$" denotes an absorption rate of the terahertz wave "W" in the "i" medium, and $R_0$ and $R_1$ denote sensitivity of the light receiver 12 at the time point of initial installation and at a specific time point, respectively. "$d_{i\text{eff}}$" denotes a traveling distance of the terahertz wave "W" in the medium "i." Air as a medium is represented by the number 4, and the release paper "F" as a medium is represented by the number 3.

Here, when "$X_1$" is divided by "$X_0$," the following Equation 3 is obtained.

$$\frac{X_1}{X_0} = \frac{E_1 R_1}{E_0 R_0} \quad \text{[Equation 3]}$$

Next, referring to FIG. 7, the terahertz wave "W" passes through the area of the release paper "F" coated with the slurry "S" and the power "$Y_{THz0}$" of the terahertz wave "W," which is obtained from the light receiver 12 at the time point of initial installation, may be expressed as in Equation 4 below and the power "$Y_{THz1}$" measuring the area of the release paper "F" coated with the slurry "S" may be expressed as Equation 5 below. The slurry "S" as a medium is indicated by the number 2.

$$Y_{THz0} = E_0 t_{42}^2 e^{-\alpha_2 d_2 eff} t_{23}^2 e^{-\alpha_3 d_3 eff} t_{34}^2 R_0 \quad \text{[Equation 4]}$$

$$Y_{THz1} = E_1 t_{42}^2 e^{-\alpha_2 d_2 eff} t_{23}^2 e^{-\alpha_3 d_3 eff} t_{34}^2 R_1 \quad \text{[Equation 5]}$$

Here, when "$Y_{THz1}$" is divided by "$Y_{THz0}$," the following Equation 6 is obtained.

$$\frac{Y_{THz1}}{Y_{THz0}} = \frac{E_1 R_1}{E_0 R_0} = \frac{X_1}{X_0} \quad \text{[Equation 6]}$$

Therefore, the correction power "$Y_{THz1}^1$" which is the corrected value of the power measured in the area of the release paper "F" to which the slurry "S" is applied, may be expressed as in Equation 7 below.

$$Y_{THz1}^1 = \frac{X_0}{X_1} Y_{THz1} \quad \text{[Equation 7]}$$

According to the above equation, by multiplying the power measured in the area of the release paper "F" to which the current slurry "S" is applied by the reference power and by dividing it by the power measured in the current release paper "F" area, the correction power may be obtained. Through this, it may be seen that $X_0/X_1$ is the correction factor for obtaining the correction value by multiplying the power of the release paper "F" coated with the current slurry "S" by the measured power.

Drying Furnace (30)

The drying furnace 30 is a component that heats and dries the slurry "S" applied to the release paper "F" to form the electrode. The release paper "F" coated with the slurry "S" is introduced into an inside of the drying furnace 30 through one end of the drying furnace 30 and the release paper "F" having the electrode is discharged to the other end of the drying furnace 30. The release paper "F" discharged from the drying furnace 30 may be wound up in the winder 22.

Content Acquisitor 50

The content acquisitor 50 is a component that acquires the platinum content of the electrode generated through the drying furnace 30. The content acquisitor 50 may be not disposed in the coating system 1 illustrated in FIG. 2 like other components, but may be installed in a separate space to measure a sample of release paper "F" taken from the line winder 22.

The content acquisitor 50 may include an X-ray light emitter 51 for irradiating X-ray to the electrode, an X-ray light receiver 52 for sensing fluorescent X-ray generated from the electrode, and a content calculating part (not shown) for calculating the platinum content of the electrode from an electrical signal generated from the fluorescent X-ray detected by the X-ray light-receiver 52. The content calculating part may calculate the platinum content of a measurement site by X-ray fluorescence analysis (XRF). The content calculating part may be included in the calculating part 13 of the measuring device 10.

The content acquisitor 50 may irradiate X-rays to the electrode to detect the fluorescent X-ray emitted therefrom, thereby calculating the platinum content of the electrode. Therefore, the platinum content calculated by the measuring device 10 may be more reliably checked.

Meanwhile, using the content acquisitor 50, the calculating part 13 may obtain a table or a relational expression which is a basis for calculating the platinum content of the slurry "S" from the power of the terahertz wave "W." The storage medium may store the above-described table or relational expression.

Figure 9:
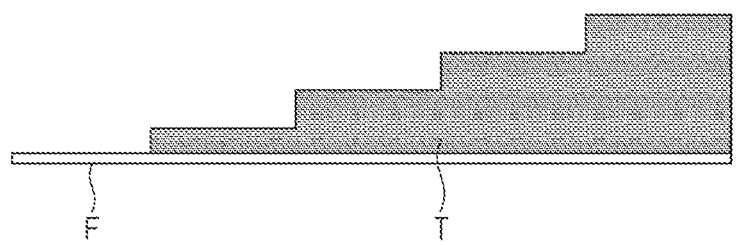
FIG. 9 is a cross-sectional view illustrating a calibration target provided to obtain a relationship between a platinum content of a slurry and a power of terahertz wave according to an embodiment of the present disclosure.
Figure 10:
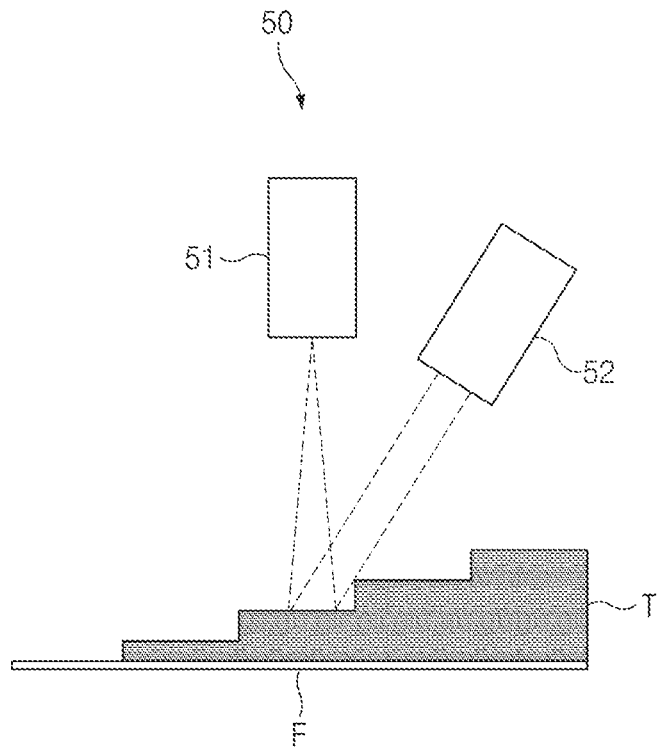
FIG. 10 is a view illustrating a situation in which the calibration target of FIG. 9 is measured using a content acquisitor.

FIG. 9 is a cross-sectional view illustrating a calibration target provided to obtain a relationship between the platinum content of the slurry "S" and the power of the terahertz wave "W" according to an embodiment of the present disclosure. FIG. 10 is a view illustrating a situation in which the calibration target of FIG. 9 is measured using the content acquisitor 50.

A method of obtaining a table or a relational expression using the content acquisitor 50 will be further described with reference to FIGS. 9 to 10. FIG. 9 is the calibration target and illustrates the electrode having a different thickness to be formed on the release paper "F". Therefore, in the calibration target, the electrode may be formed in a multi-stage structure.

To form the above-described calibration target, the slurry "S" may be applied to the release paper "F" at a different coating amount using the coating system 1, the power of the terahertz wave "W" passing through positions with each coating amount may be measured using the measuring device 10, and the slurry "S" may be dried through the drying furnace 30 to form the electrode of the multi-stage structure. The multi-stage structure electrode is discharged from the drying furnace 30, and the content acquisitor 50 acquires the platinum content at each position of the multi-stage structure electrode. Therefore, the calculating part 13 may have the power of the terahertz wave "W" and platinum content for each position of the electrode having the multi-stage structure.

Figure 11:
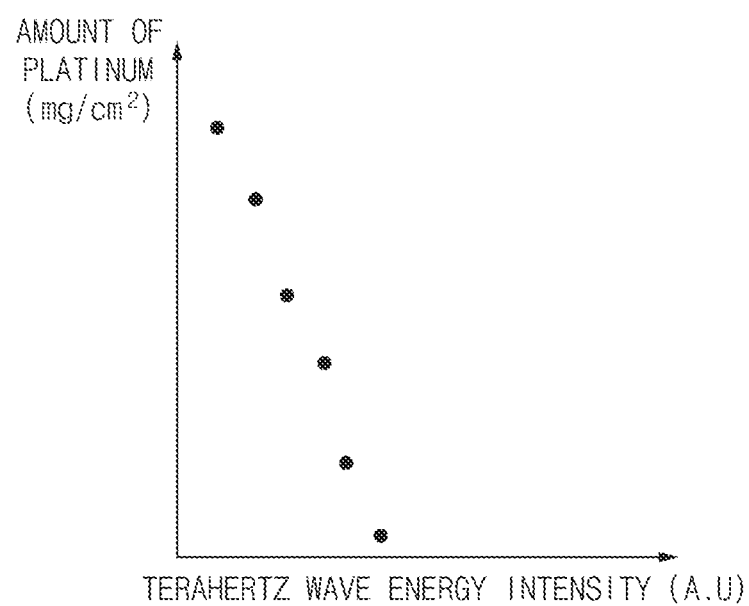
FIG. 11 is a graph including a vertical axis presenting a platinum content obtained from a calibration target in a content acquisitor and a horizontal axis representing the energy intensity calculated from a power of terahertz wave obtained by a measuring device, according to an embodiment of the present disclosure.
Figure 12:
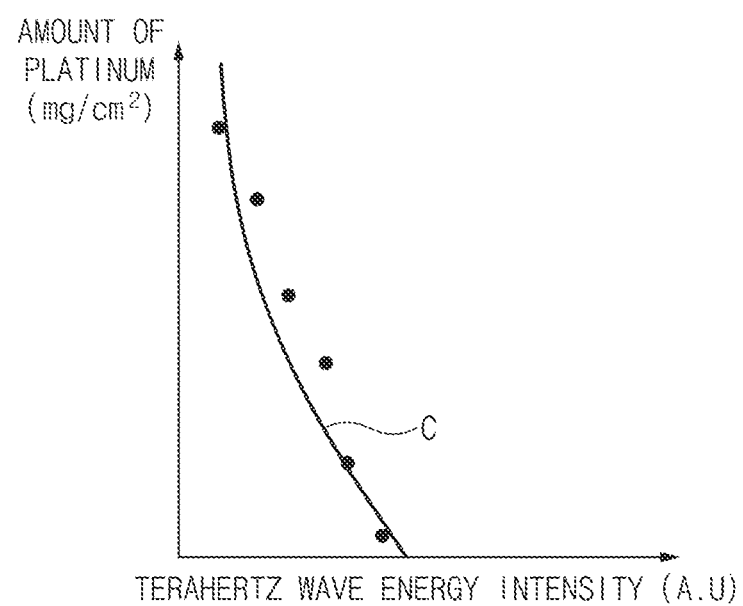
FIG. 12 is a graph illustrating a tendency line of data included in the graph of FIG. 11.

FIG. 11 is a graph including a vertical axis presenting the platinum content obtained from the calibration target in the content acquisitor 50 and a horizontal axis representing the energy intensity calculated from the power of the terahertz wave "W" obtained by the measuring device 10, according to an embodiment of the present disclosure. FIG. 12 is a graph illustrating a tendency line "C" of data included in the graph of FIG. 11.

The calculating part 13 may generate a table which matches the platinum content of the electrode obtained by the content acquisitor 50 to the power of the terahertz wave "W" obtained by the light receiver 12, respectively, and may generate a relational expression between the power of the terahertz wave "W" and the platinum content of the electrode from the generated table. The above-described relational expression may be used as a basis for calculating the platinum content of the electrode from the power of the terahertz wave "W" obtained by the light receiver 12.

Referring to FIG. 11, the horizontal axis may be the energy intensity calculated from the power of the terahertz wave "W" and the vertical axis may be the platinum content to display the data of the table on a two-dimensional graph. The energy intensity may be proportional to the power of the terahertz wave "W". The relationship between these data may be represented by the tendency line "C" of the data as illustrated in FIG. 12. An equation expressing the tendency line "C" may be a relational expression of the energy intensity calculated from the power of the terahertz wave "W" and the platinum content of the electrode.

Referring to Equations 4 and 5, it may be seen that as the power of the terahertz wave "W" increases, the thickness of the slurry "S" applied to the release paper "F" decreases logarithmically as a denominator and it may be easily seen that the platinum content contained in the slurry "S" is proportional to the thickness to which the slurry "S" is applied. Therefore, it may be seen that the platinum content is proportional to the logarithm of the value having the terahertz wave "W" as the denominator and the relational expression between the power of the terahertz wave "W" and the platinum content of the electrode may be formed to include the above-described proportional relationship. The storage medium may store the table and the relational expression formed as described above, and when the coating of the slurry "S" is performed, the measuring device 10 may use the table and the relational expression as a basis for determining whether the coating of the slurry "S" is defective or not.

Accordingly, it is possible to obtain the platinum content of the slurry to determine the thickness of the electrode while the amount of waste of the release paper and the slurry is reduced.

Although the characteristics of the light emitter and the light receiver change, the obtained power may be calibrated to properly obtain the platinum content of the slurry.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A measurement apparatus comprising:
    a light emitter configured to irradiate a terahertz wave onto a release paper coated with a slurry;
    a light receiver configured to receive the terahertz wave, which is irradiated from the light emitter and passes through the release paper coated with the slurry, to obtain a power of the terahertz wave; and
    a calculating part configured to calculate a thickness of an electrode, formed from the slurry applied to the release paper, based on the power of the terahertz wave received by the light receiver,
    wherein the calculating part includes a storage medium for storing a reference power which is a power of a terahertz wave initially passing through the release paper coated with the slurry, and
    wherein the calculating part corrects the power of the terahertz wave obtained at a specific time point using the reference power as a basis for calculating the thickness of the electrode formed at the specific time point.

2. The measurement apparatus of claim 1, wherein the calculating part is further configured to calculate a platinum content of the slurry based on the power of the terahertz wave received by the light receiver and to calculate the thickness of the electrode based on the platinum content of the slurry calculated by the calculating part.

3. The measurement apparatus of claim 1, wherein the light emitter includes a light emitting member that irradiates a continuous wave laser.

4. The measurement apparatus of claim 3, wherein the light emitting member emits the terahertz wave having a frequency of 0.1 THz or more and 10 THz or less.

5. The measurement apparatus of claim 1, further comprising:
    a notifier configured to transmit a notification to a user when the thickness of the electrode calculated by the calculating part is outside a specific thickness range.

6. The measurement apparatus of claim 1, wherein the reference power is a power of the terahertz wave passing through the release paper to which the slurry is not applied, wherein the power of the terahertz wave obtained at the specific time point includes a current slurry power, which is a power obtained at the specific time point from the terahertz wave passing through an area to which the slurry is applied among the release paper to which the slurry is applied, and a current release paper power, which is a power obtained at the specific time point from the terahertz wave passing through an area to which the slurry is not applied among the release paper to which the slurry is applied, and wherein the calculating part obtains a correction power correcting the current slurry power based on the reference power and the current release paper power to be used as a basis for calculating the thickness of the electrode formed at the specific time point.

7. The measurement apparatus of claim 6, wherein the correction power is a value obtained by multiplying the current slurry power by the reference power and dividing the above result by the current release paper power.

8. The measurement apparatus of claim 1, wherein the light receiver and the light emitter is aligned on a specific straight line, and wherein the specific straight line is arranged to form an angle less than a total reflection threshold angle with the release paper passing between the light receiver and the light emitter.

9. A coating system comprising:

a coater configured to apply a slurry to a release paper;

a light emitter configured to irradiate a terahertz wave to the release paper coated with the slurry;

a light receiver configured to receive a power of the terahertz wave passing through the release paper coated with the slurry;

a drying furnace configured to heat and dry the slurry applied to the release paper to form an electrode;

a content acquisitor configured to acquire a platinum content of the electrode and including an X-ray light receiver configured to sense fluorescent X-rays generated from the electrode; and a calculating part configured to calculate a thickness of the electrode based on the power of the terahertz wave received by the light receiver, wherein the calculating part includes a storage medium for storing a reference power which is a power of a terahertz wave initially passing through the release paper coated with the slurry, and wherein the calculating part corrects the power of the terahertz wave obtained at a specific time point using the reference power as a basis for calculating the thickness of the electrode formed at the specific time point.

10. The coating system of claim 9, wherein the calculating part generates a table in which the platinum content of the electrode obtained by the content acquisitor matches the power of the terahertz wave obtained by the light receiver to each other and generates a relational expression of the power of the terahertz wave and the platinum content of the electrode based on the generated table to be used as a basis for calculating the platinum content of the electrode from the power of the terahertz wave obtained by the light receiver.

11. The coating system of claim 9, wherein the content acquisitor includes an X-ray light emitter configured to irradiate X-ray to the electrode, and a content calculating part configured to calculate the platinum content of the electrode from an electrical signal generated from the fluorescent X-ray detected by the X-ray light receiver.

12. A measurement method comprising:

irradiating terahertz wave to a release paper coated with a slurry;

obtaining a power of the terahertz wave passing through the release paper coated with the slurry;

correcting the power of the terahertz wave obtained at a specific time point using a reference power which is a power initially obtained from the terahertz wave passing through the release paper to which the slurry is applied; and calculating a thickness of an electrode formed from the slurry applied to the release paper based on the obtained power of the terahertz wave at the specific time point.

13. The measurement method of claim 12, wherein the calculating of the thickness of the electrode includes:

calculating a platinum content of the slurry based on the obtained power of the terahertz wave; and calculating the thickness of the electrode based on the calculated platinum content of the slurry.

14. The measurement method of claim 12, wherein the calculating of the thickness of the electrode includes calculating a correction power which corrects a current slurry power, which is a power obtained at a specific time point from the terahertz wave passing through an area to which the slurry is applied among the release paper to which the slurry is applied, based on the reference power, which is a power initially obtained from the terahertz wave passing through an area to which the slurry is not applied among the release paper to which the slurry is applied, and a current release paper power, which is a power obtained at the specific time point from the terahertz wave passing through the area to which the slurry is not applied among the release paper to which the slurry is applied, to use the correction power as a basis for calculating a thickness of the electrode formed at the specific time point.

15. The measurement method of claim 12, further comprising:

transmitting a notification to user when the thickness of the electrode calculated in the calculating of the thickness of the electrode is outside a specific thickness range.

* * * * *